Figure 1:
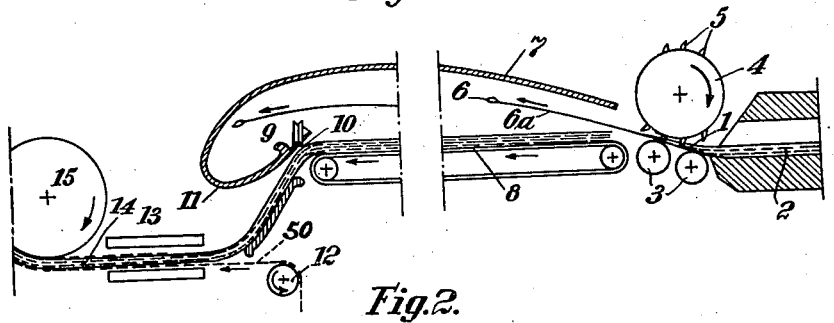

March 30, 1943. A. LAMESCH 2,314,944
METHOD OF AND APPARATUS FOR PRODUCING FILAMENTS
OR THE LIKE OF GLASS AND STRUCTURES THEREOF
Filed Sept. 23, 1937

Inventor:
Armand Lamesch
by Owen & Owen

Patented Mar. 30, 1943

2,314,944

UNITED STATES PATENT OFFICE 2,314,944

METHOD OF AND APPARATUS FOR PRODUCING FILAMENTS OR THE LIKE OF GLASS AND STRUCTURES THEREOF

Armand Lamesch, Herzogenrath, near Aachen, Germany; vested in the Alien Property Custodian Application September 23, 1937, Serial No. 165,371
In Germany October 1, 1936

21 Claims. (Cl. 154—28)

This invention relates to a method and device for the production of threads or filaments of glass or similar substances capable of being spun in molten condition, to serve as elements for constructing therefrom structures such as yarns, webs, mats or glass wool, and further to means for directly working such threads or filaments into products of this nature, such for example as heat and sound insulating materials.

It has already been proposed to produce filaments of glass by detaching individual particles from a plastic mass of glass with the aid of stringing elements, which contact molten glass and move with particles of glass picked up thereby relatively to the molten glass mass and pull the filament behind them.

However, this known method has the disadvantage that the length of the filament is limited, because the stringing element remains constantly in contact with the particle and the length of the filament depends upon the travel of said element which cannot exceed a certain distance for constructional reasons, and that further for this and other reasons the output is small.

It has also been proposed to produce filaments by projecting individual particles from a rotating drum containing the molten glass, without the employment of a separate extracting element. This renders it necessary, however, to cause the glass mass to rotate rapidly, which in turn necessitates a complicated apparatus difficult to control.

The present invention is based upon the principle of projecting individual drops or particles of liquid or plastic glass, whereby said drops or particles draw a filament behind them, but has for its object to obviate the defects of the known methods.

This result, and in addition further advantages concerning simplification and increase of output and increase of the possibilities of utilization, are achieved in the method according to the invention by the fact that the individual drops or particles of glass are extracted from a molten mass of glass by rapidly moving elements which penetrate the glass mass, and which throw off the drops or particles away from the glass mass and cause them to draw filaments behind them, the drops or particles being thus immediately detached from the extracting and hurling elements. In this manner considerably longer filaments can be produced than if the extracting member remains in permanent contact with the drops or particles. Also the extracted drops or particles are cooled to a considerably less extent, so that they retain their filament forming property much longer and no special provisions have to be made for detaching the drops or particles from the extracting and hurling element as is necessary when the drops solidify on the extracting member.

Preferably, the throwing or hurling of the drops or particles is effected in a direction which is approximately parallel to the surface of the molten glass mass, and on a substantially horizontal trajectory. The diameter of the filament to be produced may be controlled in a very simple manner by influencing the viscosity of the glass and/or the velocity of the hurling.

The drops or particles may also be detached from the lower side of a glass mass issuing from an opening of a tank, or from the front side as is hereinafter explained in detail.

The improved method of producing glass threads or filaments further enables the convenient working of the filaments for various purposes and for working up various structures.

A particular advantage and an important feature of the invention, consists in the production in continuous operation of mats, glass wool or the like of such threads or filaments, particularly such as consist of felted threads or filaments.

The invention will now be more particularly described with reference to the accompanying drawing, which shows embodiments of the invention by way of example. The invention is not restricted to such embodiments but embraces all applications of the principle of producing glass filaments from a liquid mass of glass by tearing drops or particles out of a liquid mass of glass, said drops or particles being detached from the extracting element and hurled away, and drawing the filaments behind them.

In the drawing

Figure 2:
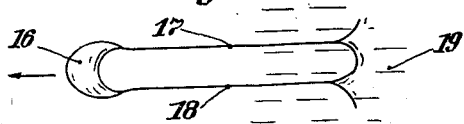
Figure 4:
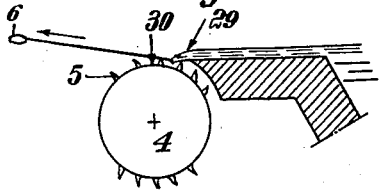
Figure 3:
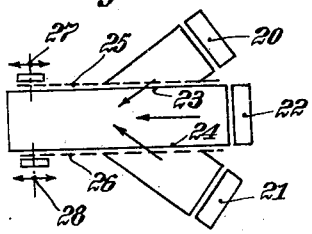
Figure 5:
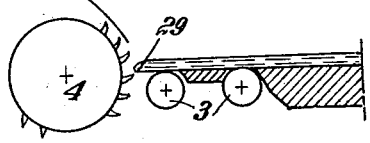

Figure 1 is a vertical section through an apparatus for carrying out the method according to the invention, Figure 2 is a plan view of a particular manner of forming the filament, Figure 3 is a plan view showing the production of mats the fibres of which disclose a felt like connection, Figures 4 and 5 show further methods of producing threads or filaments according to the invention.

Referring to the drawing, and first to Figure 1, the mass of liquid or plastic glass from which particles are pulled out or extracted and thrown or hurled off forms a band I having for instance a height of 4 mm. to 5 mm. and being continuously discharged from a melting furnace 2 by means of the rollers 3.

At a distance from the furnace, so as to obtain a suitable state of viscosity of the glass band 1, a centrifugal device is provided which in the example shown comprises a drum 4 rotating at a high and preferably regulatable speed and having a horizontal shaft. On the circumference of the drum 4 suitably shaped preferably cooled spikes or projections 5, which are preferably cooled in a suitable manner, are disposed. They may be somewhat forwardly inclined in the direction of motion of the device. The drum 4 is positioned relative to the glass in such manner that the spikes 5 enter the glass during rotation of the drum and dig out and push a small quantity of glass in front of them and out of the mass. The spikes 5 following one another in axial direction are preferably staggered relative to one another in circumferential direction, so that the amount of glass extracted by a spike remains in connection with the main mass 1 at least in the form of a thread or filament 6a, which will be the finer the farther, i. e. the more rapidly, the drop or particle is thrown off. At a suitable circumferential speed of the drum, lines of flight exceeding 10 m. will be attained. For guiding the thrown off drops or particles guide plates 7 may be employed.

Other possibilities of producing a glass thread according to the fundamental principle of the invention are indicated in Figures 4 and 5. As shown in Figure 4, the liquid glass is brought from above near the spikes 5 of the drum 4 disposed underneath the glass stream in the form of a continuous band 29, and thus comes into contact with the spikes in the upper portion 30 of the drum, though, as Figure 5 shows, where the drops are taken from the front side of the glass band, the glass band may be supplied also on another level relative to the drum 4 without involving fundamental variations of the method. In such cases feeding rollers 3 may be employed for passing the liquid glass band 29 to the drum 4.

In every instance the threads or filaments produced are approximately parallel to one another and, by means of a suitable device, comprising for instance a cutting roll 9 guided on a knife 10 and arranged near the end of the line of flight, are separated from the thrown off drops 6 and deposited on a table 8. The separated drops 6 are carried away by a suitably inclined receiving channel 11 connecting with the end of the guide plate 7.

The receiving table 8 can be immovable if mats are to be produced whose length is restricted to that of the table. If an endless mat is to be made, continuous motion in the direction of the line of flight of the drops is imparted to the surface of the table 8. Since the mat is usually composed of a great many layers of thread, the movement of the table is relatively slow, so it does not move far during one reciprocation of the cutter.

After a layer of threads has been formed, it is passed into a device capable of giving it the shape required for the various purposes, for instance that of a mat surrounded by linen, jute, paper or wire netting. For this purpose, a web 50 of linen or paper continuously unwound from a reel 12 is automatically placed around the layer or threads and connected therewith in a device diagrammatically designated at 13. The final product 14 is thus completed and can be wound upon a drum 15 or cut into lengths according to requirements.

The method according to the invention therefore makes it possible to produce a mat ready for use in a continuous manner and in a single operation. The method further insures high output which is particularly increased if the thickness of the glass band and the path of the spikes 5 are relatively adjusted so that the spikes penetrate the entire thickness of the band and, as indicated in Figure 2, each thrown off drop 16 yields two threads 17, 18, which on each side of a point 5 connect the drop 16 with the glass band 19. By arranging two or more spikes one beside the other the number of threads can be correspondingly increased.

Another advantage afforded by the invention is the possibility of obtaining felting of the thread layer in a very simple manner. For this purpose, a lateral reciprocating motion in the direction of its plane is imparted to the receiving table 8. The table may be reciprocated sidewise rectilinearly, or swung about a vertical pivot at the end adjacent to the knife 10. Owing to this motion it becomes possible to place the threads dropping onto the layer in process of formation in positions which form angles of variable degree, so that the threads, so to speak, become entangled. Felting to a still higher degree can be attained by employing several centrifugal devices which work for a joint receiving means to produce a single mat. As shown in Figure 3, two auxiliary centrifugal devices 20, 21 and a main centrifugal device 22 can be so arranged that the threads thrown off from the two auxiliary devices form an angle with the threads coming from the main device. In this way, crossed threads are obtained which give the necessary connection to the mat, the threads thrown off from the auxiliary devices being of course cut off at the edges 23 and 24 of the main layer, for instance by means of the diagrammatically shown devices 25, 26, which are moved by the means 27, 28 and substantially correspond to the cutting device 9, 10 shown in Figure 1.

To influence the felting process, that is the manner in which the threads produced by the centrifugal devices 20, 21, 22 cross each other, the lateral or auxiliary centrifugal devices are preferably arranged on levels that differ from one another and also from that of the main centrifugal device, whilst, moreover, the spikes are suitably distributed over the surface of the centrifugal drums. It thus becomes possible to regulate the order of production of the threads according to their position. To provide for some constancy of regulation it is advisable to couple the drives of the various drums.

The mats produced in the manner indicated do not comprise layers of threads extending parallel or approximately so relative to one another, with each layer sharply separated from the adjacent layers whose threads extend in another direction, but the structure produced constitutes a regular felt owing to the peculiar crossing of the individual threads.

Instead of centrifugal drums other suitable centrifugal means, such as chains or an endless band fitted with spikes and touching the glass band on their path, may be used.

What I claim and desire to secure by Letters Patent is:

1. A method of producing threads of glass and similar substances capable of being spun in molten condition, which consists in extracting individual drops or particles from a molten mass of glass by rapidly moving elements, one for each drop, penetrating the glass mass, said elements throwing off the drops or particles after they have been detached from the glass mass, the drops or particles being thus immediately separated from the extracting and hurling elements while said drops are still connected to the glass mass by threads, and regulating the thickness of the thread by adjusting the viscosity of the molten glass.

2. A method of producing threads of glass and similar substances capable of being spun in molten condition, which consists in extracting individual drops or particles from a molten mass of glass by rapidly moving elements, one for each drop penetrating the glass mass, said elements throwing off the drops or particles after they have been detached from the glass mass, the drops or particles being thus immediately separated from the extracting and hurling elements while said drops are still connected to the glass mass by threads, and regulating the thickness of the thread by adjusting the throwing-off speed.

3. The method of producing threads from a mass having the consistency of molten glass, which consists in forming the mass into a sheet, penetrating the end of the sheet by a plurality of members, moving each member, after penetration, rapidly away from the sheet and in substantially the direction of the length of the sheet and thereby separating and imparting momentum to the part of the ribbon ahead of such member, leaving the sides of said part attached to the ribbon by threads of the material, and employing the momentum of each such part to move it away from the respective penetrating member and draw the connected threads to greater length.

4. A method of producing threads of glass and similar substances capable of being spun in molten condition, which consists in extracting individual drops or particles from a molten mass of glass by rapidly moving elements, one for each drop, penetrating the glass mass, said elements throwing off the drops or particles after they have been detached from the glass mass, the drops or particles being thus immediately separated from the extracting and hurling elements, the throwing off elements penetrating at every welling out and throwing off step the entire thickness of the mass of molten glass to form two threads by each thrown off particle.

5. A method according to claim 4 in which the mass of molten glass in penetrated at a plurality of points to cause the simultaneous formation of a corresponding number of threads.

6. A method of producing a mat of threads from material having the consistency of molten glass, which consists in extracting individual drops or particles from a mass of the material, throwing the particles away from the mass, in substantially parallel directions, while still connected by threads to the mass and thereby drawing a plurality of substantially parallel threads, and cutting off the particles and dropping the threads in substantially parallel relation upon a support.

7. A method in accordance with claim 6, and comprising repeating the thread-forming operation and building up a mat by depositing successive lengths of threads upon the support.

8. A method in accordance with claim 6, and comprising repeating the thread-forming operation and building up a mat by depositing successive lengths of threads upon the support and moving the support to deposit successive layers of thread at angles to each other.

9. A method in accordance with claim 6, and comprising forming two sets of threads from different sources and directing the particles from the different sources across a common support and depositing the threads from the two sources on the support at angles to each other.

10. Apparatus for forming threads comprising means affording a supply of molten glass, a plurality of prongs, means to move the prongs into and away from the molten glass in parallel lines and to change the direction of motion of the prongs after leaving the glass, the shape of the prongs and their driving means being coordinated so that each prong separates a particle of glass from the supply and throws it away while the particle is still connected to the supply by a thread.

11. Apparatus for forming threads comprising means affording a supply of molten glass, a plurality of prongs, means to move the prongs into and away from the molten glass in parallel lines and to change the direction of motion of the prongs after leaving the glass, the shape of the prongs and their driving means being coordinated so that each prong separates a particle of glass from the supply and throws it away while the particle is still connected to the supply by a thread, a support over and past which all of the particles are thrown, and means to cut the threads beyond the support and behind the particles.

12. Apparatus for forming threads comprising means affording a supply of molten glass, a drum mounted with its periphery adjacent said supply, a plurality of prongs arranged on the periphery of said drum to follow different, parallel paths, and means to rotate the drum, the shape of the prongs being related to the speed of the drum so that each prong separates a particle from the supply of molten glass and throws it away while the particle is still connected by a thread to the supply.

13. Apparatus in accordance with claim 12 and comprising a support over and past which the particles are thrown and means to cut the threads beyond the support and behind the particles.

14. Apparatus in accordance with claim 12 and comprising a support over and past which the particles are thrown and means to cut the threads beyond the support and behind the particles, and means to reciprocate the support transversely of the direction of travel of the particles.

15. Apparatus in accordance with claim 12 and comprising an endless belt over and past which the particles are thrown and means to cut the threads behind the particles and beyond the belt.

16. Apparatus in accordance with claim 12 and comprising an endless belt over and past which the particles are thrown, means to cut the threads beyond the belt and behind the particles, a second endless belt in position to receive a mat of glass threads falling from the discharge end of the first said belt, means to feed a cover sheet onto the second said belt beneath the mat, and means to wind the cover sheet and mat into a roll.

17. Apparatus for forming a mat of glass threads comprising a plurality of sources of molten glass, means to extract from each source a plurality of particles of glass and throw them away from the source, in parallel directions, while each particle is connected to the source by a thread, a support, the throwing devices from all sources being arranged to throw particles over and past the support, and means to cut the threads beyond the support and behind the particles.

18. A method of producing threads from material having the consistency of molten glass, which consists in extracting individual drops or particles from a mass of the material by rapidly moving elements, one for each drop, penetrating the glass mass, and moving said elements so that they throw off the drops or particles after the drops have been detached from the glass mass, the drops or particles being thus immediately separated from the extracting and hurling elements while still connected to the glass mass by threads.

19. A method of producing threads from material having the consistency of molten glass, which consists in moving a band of the material, extracting a plurality of individual drops or particles simultaneously at spaced points from the under side of the forward end of the molten glass by rapidly moving elements, one for each drop, penetrating the under side of the forward end of the glass band, and moving said elements so that they throw off the drops or particles after the drops have been detached from the glass mass, the drops or particles being thus immediately separated from the extracting and hurling elements while still connected to the glass mass by threads.

20. A method of producing threads from material having the consistency of molten glass, which consists in moving a band of the material, extracting a plurality of individual drops or particles simultaneously at spaced points from the front side of the forward end of the molten glass by rapidly moving elements, one for each drop, penetrating the front side of the forward end of the glass band, and moving said elements so that they throw off the drops or particles after the drops have been detached from the glass mass, the drops or particles being thus immediately separated from the extracting and hurling elements while still connected to the glass mass by threads.

21. Apparatus for forming threads comprising means for supplying a ribbon of molten glass, a drum mounted with its periphery adjacent to the path of the ribbon, means to rotate the drum, a plurality of cooled prongs arranged on the periphery of the drum to follow different parallel paths as the drum rotates, each prong being long enough to extend across the path of the ribbon when the portion of the drum on which it is mounted is closest to the ribbon, and each prong being shaped, in relation to the speed of the drum, so that it throws off the particle of material separated thereby from the ribbon.

ARMAND LAMESCH.